United States Patent

[11] 3,563,365

[72] Inventor Henry Thomas Loberg
 2109 Mockingbird Lane, Jonesboro, Ark. 72401
[21] Appl. No. 735,651
[22] Filed June 10, 1968
[45] Patented Feb. 16, 1971

[54] ACCUMULATING CONVEYOR
 3 Claims, 6 Drawing Figs.
[52] U.S. Cl. .................................................... 198/127
[51] Int. Cl. ................................................... B65g 13/02
[50] Field of Search ........................................ 198/127, 160

[56] References Cited
UNITED STATES PATENTS
3,323,636  6/1967  Gotham ........................ 198/127
3,400,806  9/1968  Leach ........................... 198/127
3,451,527  6/1969  Leach ........................... 198/127
2,158,482  5/1939  Maltby ......................... 198/127
3,156,345  11/1964  DeGood ....................... 198/127
3,225,893  12/1965  Currie .......................... 198/127

Primary Examiner—Evon C. Blunk
Assistant Examiner—Douglas D. Watts
Attorney—John D. Pope, III ABSTRACT: An accumulating conveyor supports transport rollers on a pair of channels with snub rollers below. Adjustable spring means mount the snub rollers. An endless V-belt is trained over the snub rollers and under the transport rollers to be carried by the snub rollers and to actuate the transport rollers. The conveyor is made in sections so that several of these can be attached together, the end transport rollers joined together, and a plurality of units run from a single motor.

Patented Feb. 16, 1971

INVENTOR
HENRY THOMAS LOBERG
BY
ATTORNEY

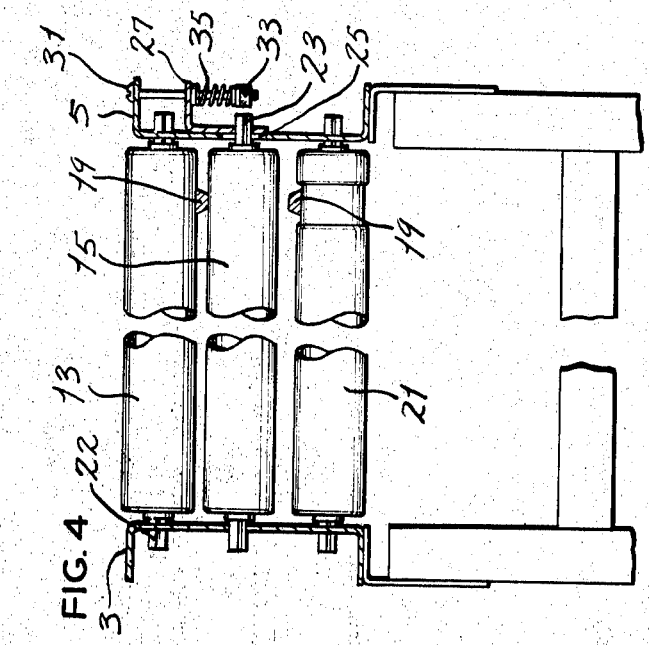
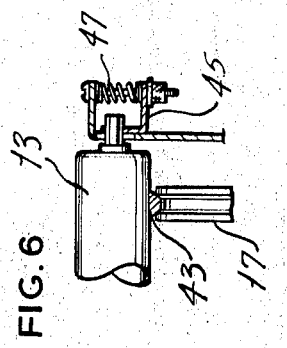
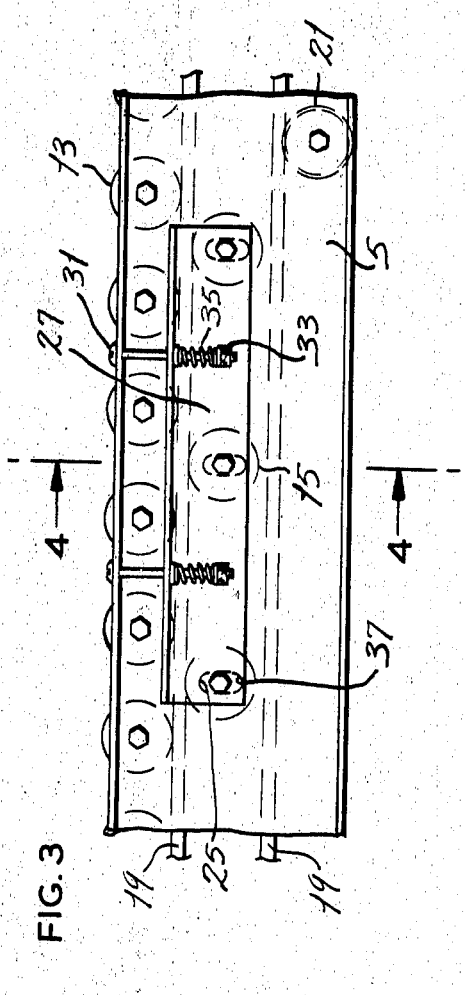
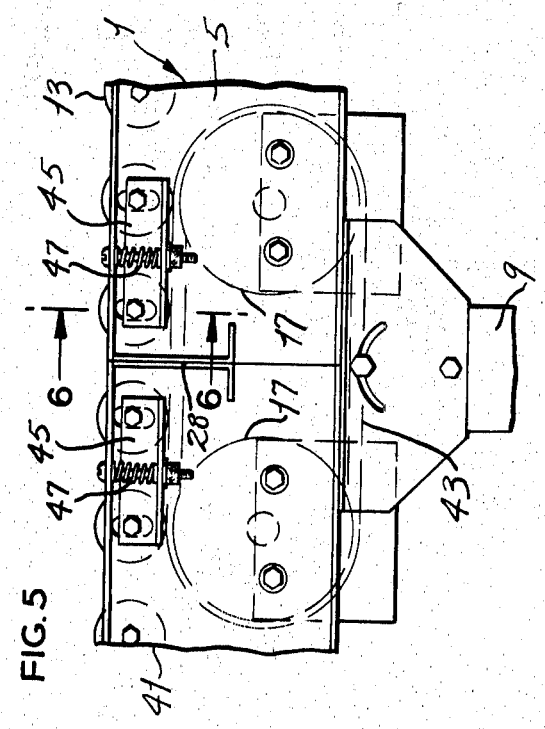

ACCUMULATING CONVEYOR

This invention relates to accumulating conveyors and, more particularly, to such conveyors constructed in sections which can be joined together to form larger units.

Among the objects of this invention are the provision of accumulating conveyors which are simple in construction and therefore easily manufactured; the provision of such conveyors having a minimum back pressure; the provision of conveyors which may be easily adjusted to different weight objects; and the provision of conveyors which convey long loads and accumulate them at a predetermined spot utilizing a motor of small horsepower. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated:

FIG. 3 is an enlarged elevation of the segment 3—3 of FIG. 1;

FIG. 4 is a section taken along line 4—4 of FIG. 3;

FIG. 5 is an enlarged elevation of the segment 5—5 of FIG. 1; and

FIG. 6 is a section taken along line 6—6 of FIG. 5.

Corresponding reference characters indicate corresponding parts throughout the several views of the drawings.

Figure 1:
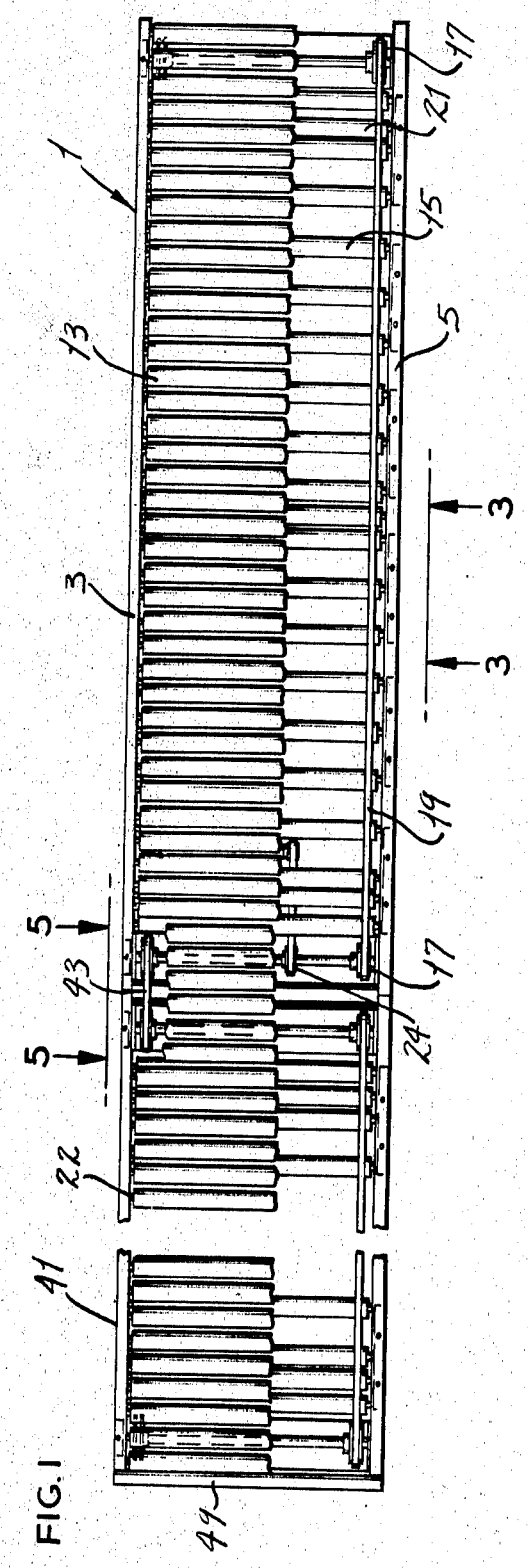
FIG. 1 is a plan view of a conveyor unit of the present invention with some parts broken away, attached to a second unit broken in the center for compactness.
Figure 2:
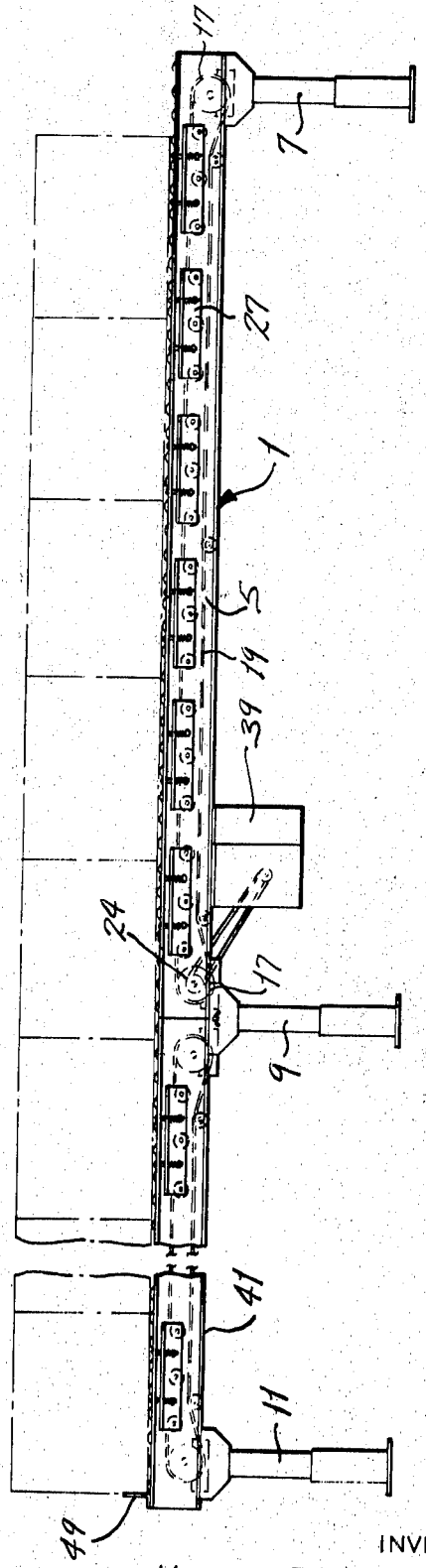
FIG. 2 is a side elevation of the FIG. 1 structure.

Accumulating conveyors have numerous valuable uses in the arts. Previously known conveyors, however, have been subject to a number of disadvantages. Some continue operation of the transport rollers after the articles on the conveyors have been brought to a stop, thereby causing frictional wear on parts of the conveyor and on the articles themselves. Others require complicated adjustments or operate unsatisfactorily when utilized to convey objects of differing weights. Still others make it difficult or impractical to reduce back pressure to a low percentage of total load.

In accordance with the present invention an accumulating conveyor is provided which is free of the foregoing disadvantages, possesses valuable operating characteristics, is inexpensive to manufacture, and is reliable in use.

Referring now to the drawings, a conveyor unit 1 includes two steel channels 3, 5. These channels support a group of tread or transport rollers 13, a group of snub rollers 15, and a group of takeup rollers 21. The channels are supported by legs 7, 9, 11, utilized in pairs. These legs position the conveyor at a desired height from the floor.

In FIG. 1 the transport rollers have been broken midway to show snub rollers 15 and other portions of the equipment below. Snub rollers 15 are fewer in number than transport rollers 13 and each is positioned between two transport rollers. The number of takeup rollers 21 is merely sufficient to carry the return course of an endless V-belt 19.

V-belt 19 is trained around drive wheels 17 located at both ends of unit 1 and supported by channels 3, 5, below transport rollers 13 and apart from snub rollers 15. Belt 19 is carried by snub rollers 15 on its upper course and is positioned to bear against and operate transport rollers 13. On its return course, belt 19 is supported by takeup rollers 21.

The axles 22 of transport rollers 13 are held in hexagonal openings, spaced at appropriate intervals, in channels 3, 5. Transport rollers 13 are, therefore, supported directly by these channels. Snub rollers 15, however, are supported on one side by channel 3 and on the other by notches 25 in suspension angles 27. The axles 23 on the channel 5 side of snub rollers 15 are received in these notches so that on the channel 5 side snub rollers 15 are supported by suspension angles 27. Angles 27 are attached to channel 5, by bolts 31. The attachment is made utilizing knurled adjusting nuts 33 and springs 35 which bring the bottom 37 of each notch 25 into supporting position for its axle 23. By adjusting nuts 33 the position of belt 19 is altered and, as stated above, it should be positioned to bear against transport rollers 13.

The power for operating the conveyor is furnished by a motor 39 which operates a drive wheel 24 attached to one of the belt drive wheels 17 adjacent thereto. Motor 39 should be mounted near the end of a unit to obtain maximum efficiency.

As illustrated in FIG. 1, more than one unit may be coupled together. Unit one is shown coupled to another identical unit 41 by joining together the belt drive wheels 17 of each as shown in FIG. 5 by means of a belt 43. The channels 3, 5, of each should be attached together at their ends as shown at 28. Furthermore, only one set of legs is needed at the juncture. Legs 9, for example, support the connected ends of units 1 and 41 and are located under the juncture. The transport rollers 13 adjacent the ends of each unit are preferably spring suspended by suspension angles 45 and springs 47 to smoothly carry objects from one unit to the other.

For many installations it is desirable to attach a stop 49 at the end of the entire assembly. This provides a target for the objects being transported and as soon as the leading object reaches it, this object stops and the following objects stop in order thereafter.

In lieu of stop 49, other means can be employed for beginning the accumulation of the transported articles; in some instances the leading objects may even be stopped manually by the operator. However, when the leading object is stopped, the other objects will line up behind it.

If the conveyor is to transport objects in both directions, a stop 49 or other means for stopping the leading object may be positioned at each end of the assembly.

It has been found that a single motor of one-third horsepower can operate as many as 10 units 1 and 41 all coupled together, to transport objects having a total weight of approximately 1,000 pounds and to accumulate them at one or both ends of the assembly. When the conveyor is operated, the objects will be transported in the direction in which motor 39 is moving transport rollers 13 until the first object reaches stop 49 or other stopping means. The following articles then continue moving until they reach the stopped object. They stop consecutively until they are all in line back of the first object.

The mounting of snub rollers 15 on spring-tensioned suspension angles 27 senses the required driving friction so that transport rollers 13 will move the objects being transported until one of them reaches a stop 49 or is manually stopped. This is true regardless of the length of the accumulated load. The required driving friction is low enough so that the pressure can be maintained constantly to give a 2 percent minimum back pressure of the total distributed load, in either a forward or reverse direction. Long loads can be conveyed, accumulated, or stopped on the conveyor at any point using very little motor horsepower and with no substantial pressure between the individual transported objects.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A conveyor for transporting and accumulating articles comprising a pair of supporting channels; a plurality of transport rollers carried by said channels; elongated snub rollers carried by said channels below said transport rollers in offset position with respect to said transport rollers, each of said snub rollers having one of its ends vertically movable toward and away from said transport rollers; an endless belt trained over and carried by said snub rollers, said endless belt having a width less than the diameter of said transport rollers and including a portion extending between said one ends of said snub rollers and said transport rollers; a plurality of vertically disposed bolts mounted on said channel; means slidably connecting each of said one ends of said snub rollers to one of said bolts for vertical sliding movement thereon; a spring surrounding each of said bolts and yieldably urging said one ends of said snub rollers vertically upwardly so as to press said belt against said transport rollers; and spring adjustment means for adjusting the pressure with which said springs urge said belt against said transport rollers.

2. A conveyor according to claim 1 wherein said spring adjustment means include a nut threadably mounted on each of said bolts; said means for connecting said one ends to said bolts including at least one suspension member slidably mounted on at least one of said bolts for vertical sliding movement thereon; said one ends of said snub rollers being carried by said suspension member; said spring being yieldably compressed between said suspension member and said nut.

3. A conveyor according to claim 1 wherein said belt is V-shaped in cross section.